UNITED STATES PATENT OFFICE.

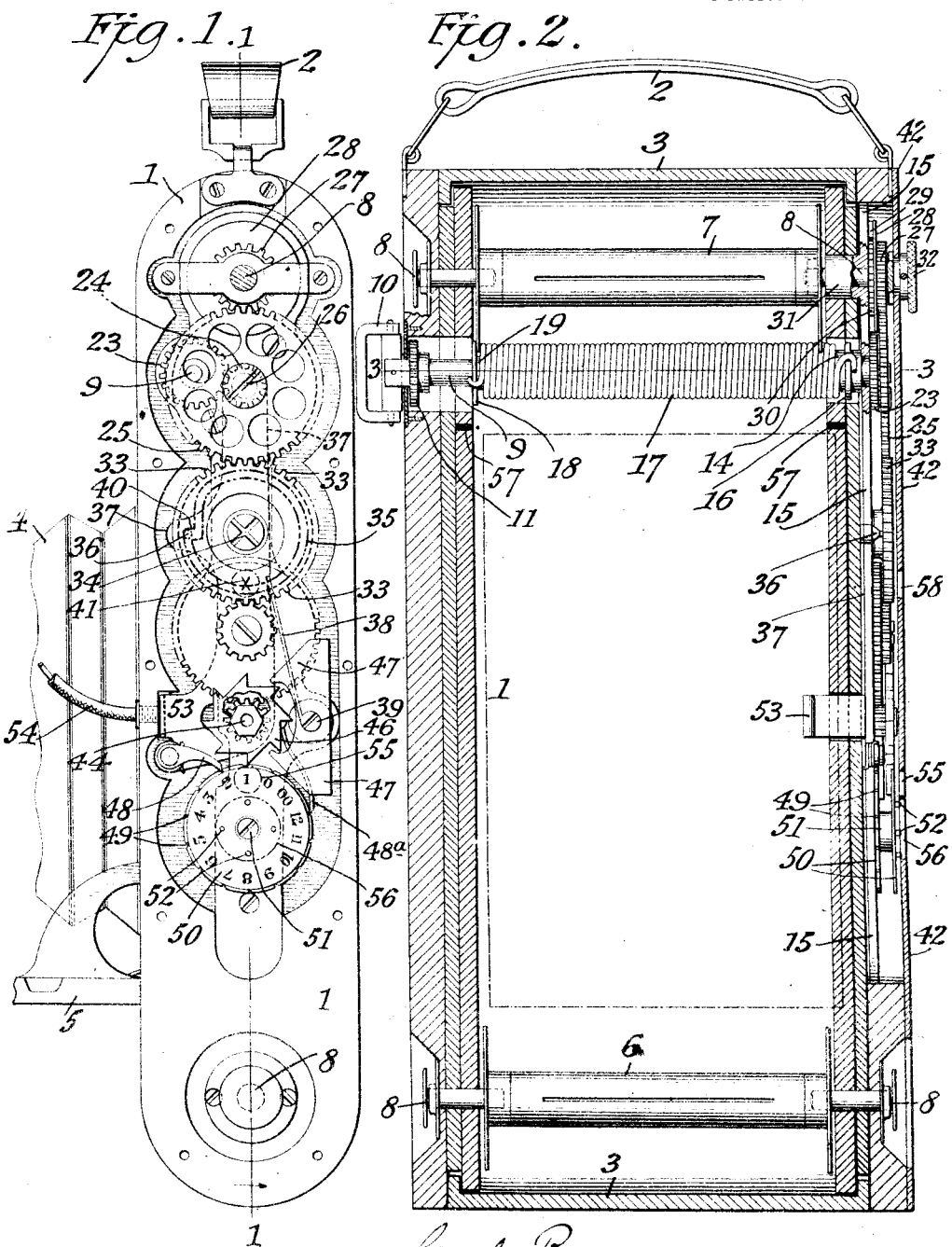

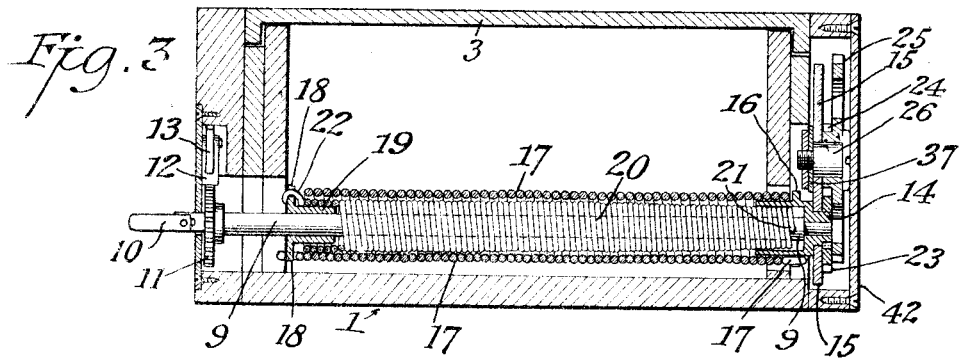
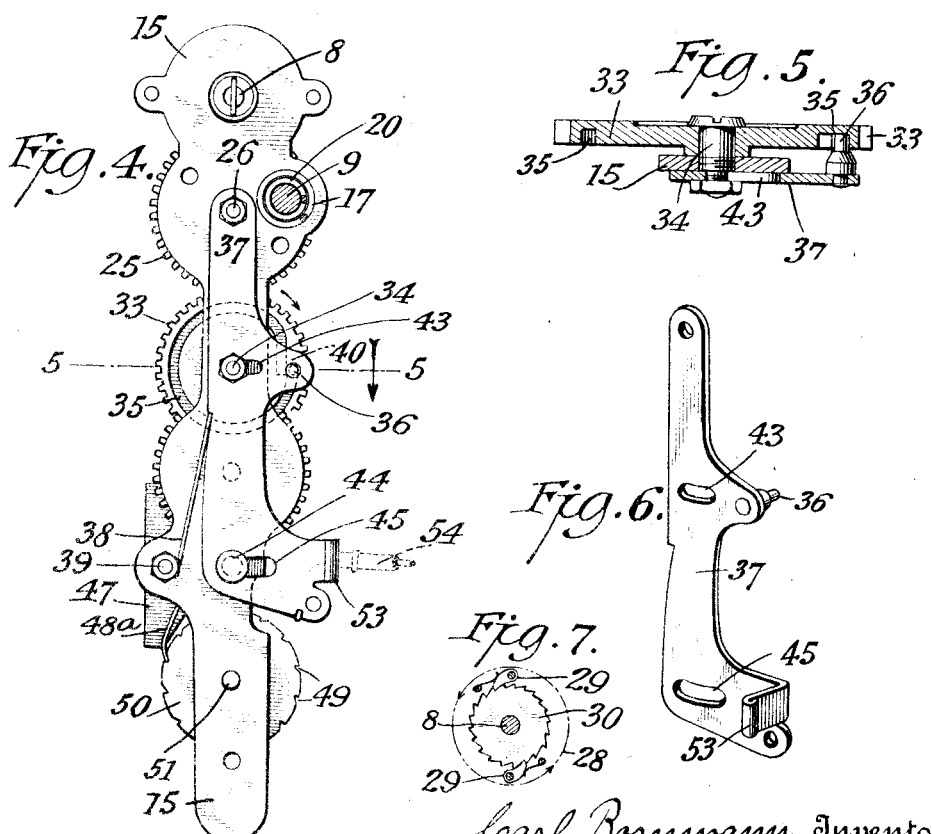

CARL BORNMANN AND EZRA C. CLARK, OF BINGHAMTON, NEW YORK, ASSIGNORS TO ANSCO COMPANY, OF BINGHAMTON, NEW YORK, A CORPORATION OF NEW YORK.

PHOTOGRAPHIC CAMERA.

1,197,901. Specification of Letters Patent. Patented Sept. 12, 1916.

Application filed December 17, 1915. Serial No. 67,314.

*To all whom it may concern:*

Be it known that we, CARL BORNMANN and EZRA C. CLARK, both citizens of the United States, and both residents of the city of Binghamton, county of Broome, and State of New York, have invented certain new and useful Improvements in Photographic Cameras, of which the following is a specification.

It is the purpose of our invention to provide a camera, which shall embody the following features, among others: (*a*). There is provided a suitable motor, with co-acting mechanism, whereby the film is made to automatically, successively and intermittently move in the field of the camera on the focal plane, in proper position for exposure, and then move away therefrom and be wound up on the take-up spool. (*b*). Suitable releasing and locking devices for the motor and its co-acting mechanism are provided, whereby it is possible to expose successive sections of film with extreme rapidity, with assurance that the pictures produced thereon will be properly located, and without moving the camera. (*c*). There is no observation of the transit of the film from the stock spool to the take-up spool. As a result, no black paper, with the usual markings, is necessary except at the extreme ends of the film to protect it against the action of light when outside of the camera.

Referring to the drawings, Figure 1 is a side elevation of a camera embodying the invention, showing the train of gears which actuate the film and other coöperating parts, the side plate of the camera, which normally covers these gears, being removed; Fig. 2 is a vertical sectional view on the line 1—1 of Fig. 1, the parts pertaining more particularly to this invention being shown in elevation; Fig. 3 is a horizontal sectional view taken on the line 3—3 of Fig. 2; Fig. 4 is an elevation of the back or inside surface of the base plate which supports the train of gears, showing also the releasing and locking lever; Fig. 5 is a detail of the cam wheel and stop which co-acting with the releasing and locking lever control the spring motor and consequently the movement of the train of gears. The stated parts are shown in section; Fig. 6 is a detail of one of the releasing levers; Fig. 7 is an elevation of the pawl-carrying plate and ratchet whereby the rotation of the spindle of the winding spool is effected.

In the drawings 1 represents the body of an ordinary folding camera, 2 the carrying strap or handle, 3 the removable back, 4 the bellows, 5 the usual drop front, 6 the stock spool, 7 the take-up spool, 8, 8, the spool centers.

9 (see best Fig. 3) is a shaft provided at one end on the outside of the camera with a winding key 10. 11 is a ratchet, with which engages a pawl 12 (see Fig. 3). The pawl has the usual spring 12. Fast on the other end of the shaft 9 is a sleeve 14, a part of which acts as a journal for that end of the shaft, being supported in the base plate 15, which supports the train of gears about to be described. This base plate is preferably housed within a suitable recess made in the side of the camera. On the sleeve 14 is a flange 16, to which is fastened one end of a spiral spring 17, the other end of which is fastened to a flange 18 on a sleeve 19, which turns loosely upon the shaft 9.

20 is a spiral spring smaller than and inside of the spring 17. At one end 21, it is fast to the shaft 9, and at its other end 22, it is fast to the flange 18 on the loose sleeve 19.

23 is the main driving gear of the mechanism. It is fast upon the outer end of the sleeve 14.

The devices just described constitute the spring motor and co-acting parts of the apparatus and the purpose of inclosing one spiral spring within the other is to afford greater length of spring and hence more uniformity in its tension, at the same time reducing the longitudinal space required.

The main driving gear 23 meshes into a small gear 24, which lies beneath and is integral with a larger gear 25. The gears 24 and 25 rotate upon an axis 26 and the gear 25 meshes with a gear 27 (see Fig. 2), which is attached to a thin plate 28, carrying a pair of pawls 29, which engage with a ratchet 30, which ratchet is splined to the spindle of the center 8 preferably by the ordinary feather and groove, so as to rotate with the spindle, whereas the gear 27, plate 28 and pawls 29 are loose upon the spindle and are adapted to rotate thereon. The spindle of the center 8 is supported by and rotates in a boss 31, which, as shown, is integral with, or forms part of the plate 15, and it is provided with a knurled head 32 on the outside of the camera, whereby it may be easily turned. It will be particularly noticed that the pawls 29 will permit rotation of the winding spool in one direction, when the train of gears is locked, as hereinafter described, and when the train of gears is actuated by the motor in the opposite direction, these pawls, engaging with the ratchet 30, will likewise cause rotation of the winding spool.

The gear 25 (see Fig. 1) also intermeshes with a gear 33, which rotates upon an axis 34. This gear we call the controller. It is provided on its rear side with a cam groove 35, in which works a stop pin 36, which forms part of a lever 37, which is pivoted at any suitable point, as, for example, upon the axis of the gear 25. This lever 37 is provided with a spring 38, which is fastened at one end, as at 39, to any fixed part of the apparatus. The function of the spring 38 is to normally thrust the lever to the left, as shown in Fig. 1, thus, when the train of gears has been released by pressing the lever to the right, so that the stop 36 is disengaged from the shoulder 40 located in the cam groove 35, then, upon the completion of a single revolution of the controller gear, the stop 36 will again come opposite the recess or shoulder 40, the lever, being pushed by the spring 38, will be swung to the left and the stop 36 again engaging under the shoulder 40, thus locking the motor and bringing the mechanism to a standstill. Upon this controller gear is a suitable indication 41, shown as X in the present instance, the purpose of which is to indicate to the operator when the motor has stopped at the proper position, which is observable through a small opening in an exterior for plate 42, see Fig. 2, which incloses the train of gears, thus protecting it from injury and excluding dust and dirt.

The details of the controller lever 37, with its stop 36, are best shown in Figs. 4, 5, and 6, where it is seen pivoted upon the axis 24 of the gear 25 and as supported and guided by the axis 34 of the controller gear 33, which works through the slot 43 made in the lever, and also by the axis 44 of a governor shown in this case as an ordinary escapement regulating device. The axis 44 works through a slot 45 made in the lever. The escapement device is shown at 46, see Fig. 1, and is provided with the usual vibrator 47, which may beneficially be pivoted upon the screw, or other device 39, which supports the end of the spring 38. Upon the lever 37 is pivoted a spring actuating pawl 48, which engages in detents 49, made in the periphery of an indicator wheel 50, upon which wheel are numerals, in the present instance, from 1 to 12, together with the additional designations 0 and 00. This indicator is pivoted at 51 and, as is obvious, at each movement of the controller lever to the right, the pawl 48 engages successively in the detents 49 on the periphery of the indicator wheel 50, and sets it over one number for each oscillation of the lever, and it will be held against return movement by the holding pawl 48ª, which engages in the detents 49. In order that the indicator wheel may be brought around to 00, or otherwise adjusted, if occasion shall require, the face of the indicator wheel upon which the stated designations are produced, is cut away at the center, as shown in Fig. 1, and a series of pins 52 are set in the wheel, whereby the operator may conveniently rotate the indicator wheel, turning always to the right, to bring it to 00, or other desired designation, and since there is no connection between this indicator wheel and the train of gears, or releasing lever, except the pawl 48, obviously there will be no disturbance of the gears or of the film, since, as stated, the indicator wheel will always be turned to the right.

The actuating lever may be tripped in any preferred manner. We show two methods. One is a press button, or equivalent device 53, which, as shown best in Fig. 2, projects inwardly on the interior of the camera, readily accessible to the thumb or finger of the operator, pressure upon which will press the actuating lever to the right against the stress of its spring 38. We sometimes supplement this press button with a penumatic or mechanically operating device, indicated at 54, many of which are now well known, so that specific description is not necessary. Such a device will be preferred in some instances, since, if used, the lever can be tripped, while the operator stands at some distance from the camera, and also there is ordinarily less liability of moving or shaking the camera. In some instances, moreover, we prefer to use such a mechanical or pneumatic lever tripping device alone, without any press button, or equivalent.

In order that the designation X on the controller or cam gear and also the designations on the indicator wheel may both be observed from the exterior of the camera, and also that access may be had to the pins 52 on the indicator wheel for adjustment thereof, we provide the exterior cover plate 42 with openings (see Fig. 2) 58, through which the designation X may be observed, 55 through which the designations on the index wheel may be observed, and 56 through which access may be had to the pins 52.

The cover plate 42, which incloses and protects the train of gears and co-acting parts, against injury, and also excludes dust, dirt, etc., may be of any preferred material ordinarily a thin metallic plate, which may be finished in any preferred manner, but in some instances it will be desirable to make it of transparent material, as, for instance, a plate of glass, or preferably celluloid, which not only exposes the train of gears to view which being handsomely finished, is attractive in appearance, but also enables partial observation, at least, of the mechanism for the detection of troubles, should they arise.

The operation is as follows: Assume that a new twelve exposure film is to be used. At starting the designation 00 should appear at the observation opening 55. If not, then by appropriate manipulation of the indicator wheel, by means of the pins 52, the designation 00 is brought into view at the opening 55. Likewise, the designation X upon the controller or cam gear should appear at the observation opening 58. If not, then by proper manipulation of the knurled head 32 of the right hand center 8 of the winding spool, the train of gears may be so rotated that the designation X will be brought opposite its observation opening 58, and when in that position the stop 36 of the locking lever 37 will be in contact with the shoulder 40 in the cam groove in the controller gear 33 and the train of gears will be locked. Thereupon, the operator removes the back of the camera in the usual way, inserts a loaded stock supply spool by the usual manipulation of the spool centers, etc., leads the black paper and film, or the leading strip, if no black paper be used, from the supply spool across the focal plane and engages it in the usual manner with the take-up spool. Thereupon, the take-up spool is turned, the back of the camera being still off, in the direction permitted by the ratchet and pawls 29 until a suitable mark or designation upon the edge of the black paper, or of the leading strip, or of the film, as the case may be, coincides with the mark or marks upon the camera, which may be located in any suitable place, but which we show in Fig. 1, at 57. It will be noted that the winding of the free end of the black paper, leading strip, or the like, upon the take-up spool, is an entirely separate and distinct operation from the turning of the spool by the motor and is merely for the purpose of properly adjusting the film within the camera preparatory to the subsequent automatic and successive advancements thereof by the motor and its gear mechanism described. Thereupon, the back of the camera is put in place and the motor spring of the train of gears is wound up by appropriate turning of the key 10. For the best operation of the apparatus it is wise, as far as may be, to maintain the motor spring always near the top of its stress. Thereupon the tripping device of the controller lever, either the press button, or the mechanical or pneumatic tripping device, is manipulated, whereupon the motor will start the gears in motion, during which the stop 36 upon the controller lever 37 will travel through the cam groove 35 of the controller wheel 33 until that wheel has made a complete revolution, then the stop 36 will come opposite the shoulder 40 in the cam groove, the spring 38 of the controller lever will swing it and the stop 36 to the left, the latter passing beneath the shoulder 40, whereupon the motor will be controlled and the train of gears come to a stop, and during this movement of the train of gears, the winding spool will be caused to rotate to such degree that an amount of the black paper, or leading strip, or film, equal to an exposure length, will have been wound thereon, and also the designation 00 upon the indicator wheel, owing to the rotation of that wheel, caused by the engagement of the pawl 48, which is carried by the controller lever 37, in the detents 49 upon its periphery, will have passed from view and the designation 0 will appear at the observation opening 55. Thereupon the locking lever will be again tripped in the manner before described, the motor will be again released, the train of gears will again actuate the winding spool, and the second length or section of the black paper, leading strip, or film, as the case may be, will be advanced, and the designation 0 having passed away from the observation window 55, the designation 1 will appear thereat, and this indicates that a section of the film is in proper position in the focal plane for making the first exposure.

It will be noted that the designations upon the black paper, or upon the leading strip, or upon the film, as the case may be, which are made to coincide with the markings 57 upon the camera, as heretofore explained, will of course bear such relation to the first exposure length of the sensitized film as that the results above referred to will be accomplished. Thereupon, the subject having been duly found in the finder of the camera, the lens shutter will be released and the first exposure made in the usual manner. Following this successive sections of sensitive film will be brought into the focal plane for subsequent exposures and the exposures made by appropriate repetitions of the procedures above described.

It will be particularly noted that our invention enables a series of exposures to be made in very rapid succession without moving the camera, if desired, and that during this procedure, the operator has nothing to do except manipulate the releasing devices for the shutter and the locking lever and may keep his eyes upon the subject or subjects, as shown in the finder, or otherwise; also that any desired number of exposures may be made at any one time, the unexposed portion of the film remaining in the camera protected from light and ready for subsequent use as occasion may require.

As intimated above, we prefer that the tension of the motor spring should be maintained at or near the top of its stress, so as to be sure that the train of gears will operate vigorously and effectively if it shall become desirable to take pictures in rapid succession.

It will also be noted that we secure, in addition to the above, a series of other advantages: After each exposure the camera may be instantly put in readiness for the exposure next to follow by a simple release of the motor and gears; also since the film is never exposed to light and there are no peep holes through which it, or the black paper, may be observed, there is no occasion for anything more than the terminal pieces of protecting paper and the continuous black paper co-extensive in length with the film and bearing the usual markings, which are liable to be offset on the film, is unnecessary; also that any known form of film now upon the market may be used; and finally, the mechanism is so compact and adapted to be set into one of the side plates of the camera, that it will very little, if at all, increase the present size thereof. This is an important feature because it is extremely desirable to maintain the dimensions of cameras, particularly the folding variety, as small as possible, and this result we further secure because, as will be noted more particularly to Figs. 1 and 3, the entire motor mechanism is offset to one side relative to the transverse axis of the camera and utilizes otherwise unused space.

It will be obvious to those who are familiar with this art that the mechanism above described and illustrated is one form only in which the invention may be embodied and that other mechanism, differing in details, may embody the invention, and we therefore do not limit ourselves in these respects.

We claim:

1. A film roll camera having a motor located entirely within the camera box and which positively drives the take-up spool in one direction, means to start and stop the motor at predetermined times and an indicator observable from the exterior of the camera, whereby the operator may determine whether the parts are in proper position for making an exposure.

2. A film roll camera having a motor which positively drives the take-up spool in one direction, means to start and stop the motor at predetermined times, an indicator observable from the exterior of the camera, whereby the operator may determine whether the parts are in proper position for making an exposure, and another indicator which shows the number of exposures made and the one next to be made.

3. A film roll camera having a motor which positively drives the take-up spool in one direction, a governor to regulate the action of the motor, an automatically actuated indicator which shows the number of exposures made and the one next to be made, and another indicator whereby the operator may determine whether the parts are in proper position for making an exposure.

4. In a film roll camera, a spring-actuated motor connecting with a train of gears let into the side of the camera box, whereby the take-up spool is rotated in one direction, an automatically operated indicator actuated by the train of gears to show the position of the parts, a governor to regulate the action of the motor, and an indicator which shows the number of exposures made and the one next to be made, all actuated and performing their several functions at one and the same time.

5. In a film roll camera, a spring actuated motor located entirely within the box of the camera and connecting with a train of gears, whereby the take-up spool is rotated in one direction, an automatically operated indicator actuated by the train of gears to show the position of the parts, a governor to regulate the action of the motor, an indicator which shows the number of exposures made and the one next to be made, all actuated at one and the same time, and means to release and to automatically lock the motor and stop the mechanism at predetermined times.

6. In a film roll camera, a motor for automatically actuating the take-up spool comprising spiral springs, one within the other, and located entirely within and extending from side to side across the camera box, and means whereby the springs when under stress will rotate the main shaft of the motor in one direction.

7. In a film roll camera, a motor for automatically actuating the take-up spool comprising spiral springs, one within the other, and located entirely within and extending from side to side across the camera box, means whereby the spring when under stress will rotate the main shaft of the motor in one direction, and means to release the motor and to lock and stop the same and the mechanism driven by it at predetermined times.

8. In a film roll camera a train of gearing supported upon a plate let into the side of the camera, a motor located entirely within the walls of the camera and engaging with said train of gearing, whereby at predetermined times the gearing is automatically operated by the motor, and indices automatically actuated by the gearing, whereby the position of the parts and the number of the exposures are both shown.

9. In a film roll camera a train of gearing supported upon a plate let into the side of the camera, a motor located entirely within the walls of the camera and engaging with said train of gearing, whereby at predetermined times the gearing is automatically operated by the motor, indices automatically actuated by the gearing, whereby the position of the parts and the number of the exposures are both shown, and a governor to control the action of the motor.

In testimony whereof we have signed our names to this specification.

CARL BORNMANN.
EZRA C. CLARK.